United States Patent
Dietrich

(10) Patent No.: US 6,485,056 B2
(45) Date of Patent: *Nov. 26, 2002

(54) APPARATUS FOR A SAFETY BELT HEIGHT ADJUSTER

(75) Inventor: Guenter Dietrich, Freiberg (DE)

(73) Assignee: Dr. Ing. h.c.F. Porsche AG, Stuttgart (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/802,991

(22) Filed: Mar. 12, 2001

(65) Prior Publication Data

US 2001/0020784 A1 Sep. 13, 2001

(30) Foreign Application Priority Data

Mar. 11, 2000 (DE) .......................... 100 11 907
Feb. 15, 2001 (DE) .......................... 101 06 994

(51) Int. Cl.⁷ ............................................. B60R 22/28
(52) U.S. Cl. ..................................................... 280/805
(58) Field of Search ........................... 280/805, 801.1, 280/808; 297/482, 470, 471, 483, 464, 468

(56) References Cited

U.S. PATENT DOCUMENTS

| | | |
|---|---|---|
| 4,871,192 A | 10/1989 | Escaravage et al. |
| 5,529,344 A | 6/1996 | Yasui et al. |
| 5,791,687 A * | 8/1998 | Gotou et al. ................ 280/805 |
| 5,826,907 A | 10/1998 | Saito et al. |
| 5,836,613 A | 11/1998 | Saito et al. |

FOREIGN PATENT DOCUMENTS

| | | |
|---|---|---|
| DE | 4010209 | 10/1991 |
| DE | 295 19 483 U1 | 5/1996 |
| DE | 196 51 092 A1 | 7/1997 |
| DE | 197 19 572 A1 | 11/1997 |
| EP | 0927668 | 7/1999 |

* cited by examiner

Primary Examiner—Paul N. Dickson
Assistant Examiner—Faye M. Fleming
(74) Attorney, Agent, or Firm—Crowel & Moring LLP

(57) ABSTRACT

A connecting screw for a locking rail of a vertical belt adjuster is anchored in a threaded head of a sleeve element anchored in a vehicle pillar wall. The sleeve element can be positioned during installation by a guide element which envelops the threaded head and is disposed so as to clamp in notches of the threaded head.

18 Claims, 2 Drawing Sheets

APPARATUS FOR A SAFETY BELT HEIGHT ADJUSTER

This application claims the priority of German Patent Document 100 11 907.7, filed in Germany, Mar. 11, 2000, and German Patent Document 101 06 994.4, filed in Germany, Feb. 15, 2001.

The invention relates to a deformation element assembly for a vertical belt adjuster of a safety belt system or for a retaining rod of a new-equipped partition wall in a motor vehicle, whereby the deformation element is disposed between a receiving element and a column or pillar of a motor vehicle.

German Patent document DE 196 51 092 A1 (U.S. Pat. No. 5,791,687) discloses a safety belt device, where an anchor element is connected to the vehicle body by means of a screw held in an absorption element. The screw is held in position by means of a spring element on a pillar of the vehicle.

Furthermore, U.S. Pat. No. 5,836,613 discloses a safety belt device that is fastened to a vehicle pillar by means of a connecting bolt and is connected to a conical element that is fixed in a holding member by means of overlapping claws or the like. In the event of a head impact, the conical element detaches in that the overlapping claws bend upward so that the result is some degree of absorption of the impact energy.

Moreover, German Patent document DE 295 19 483 U1 discloses a device for supporting a safety belt strap in a motor vehicle with the end or deflection assembly hardware for the belt strap. Said hardware is anchored on the motor vehicle body over the shoulder height of a passenger to be strapped in. Between the end or deflection assembly hardware and the vehicle body there is at the anchoring point an energy absorber, which is effective when a force is directed toward the end or deflection assembly hardware outwardly from inside the vehicle.

An object of the invention is to provide a deformation element for a vertical belt adjuster of a safety belt system or for a mounting device of a net-equipped partition wall in a motor vehicle that guarantees a reliable connecting screw for the vertical belt adjuster or for the retaining rod. Said connecting screw can be optionally tightened and absorbs bending moments. In the event of head impact a deformation of the mounting or the fastening for the vertical belt adjuster is guaranteed.

This object is achieved according to preferred embodiments of the invention by providing a deformation element assembly for a vertical belt adjuster of a safety belt system or for a retaining rod of a net-equipped partition wall in a motor vehicle, whereby the deformation element is disposed between a receiving element and a pillar of a motor vehicle, wherein the receiving element is held on a pillar wall of a vehicle body pillar with intercalation of the deformation element; by means of a fastening screw which is passed axially through, starting from the receiving element, and is held in a threaded head of a sleeve element, wherein the threaded head rests against an inside wall surface of the pillar wall in an operating position; and in a head impact position the threaded head is detached from the inside wall surface of the wall.

According to one design of the invention, the locking rail of a safety belt system is held on a pillar wall of the vehicle body with a receiving element formed as a support plate, with intercalation of a deformation element. By means of a fastening screw, which is passed through, starting from the locking rail, and is held in a threaded head of a sleeve element, the threaded head rests against an inside surface of the pillar wall in one operating position. In a head impact position the threaded head of the sleeve element is detached from the pillar wall due to the deformation of the deformation element of the threaded head of the sleeve element. In this manner a definable and reliable tightening of the screw is achieved; and the sleeve element assumes the bending moments, resulting from a belt pull.

According to another design of the invention, the deformation element can also be used for a retaining rod of a net-equipped partition wall. This net-equipped partition wall is disposed at right angles in the vehicle and is fastened by means of the retaining rods on the side in the vehicle body. This net-equipped partition wall serves to retain animals, objects or the like, which are in the rear of the vehicle and which are thrown to the front in the event of a crash or when the motor vehicle is suddenly braked. In this case the receiving element comprises a locking element with a keyhole shaped receiving opening for the free end of the retaining rod of the net-equipped partition wall. This free end is provided with a collar, which reaches behind the keyhole shaped receiving opening and thus can be fixed in position. To ensure that this rod will deform or recede in the event of a head impact, the deformation element is held between the body pillar and the receiving element, such as the locking element.

The sleeve element extends preferably from the receiving element (support plate, locking element) through the deformation element and is braced with the threaded head against an inside wall surface of the pillar of the vehicle body. In the threaded head of the sleeve element the fastening screw is held in such a manner that the receiving element is tensioned between the threaded head of the sleeve element and the head of the fastening screw.

A guide element for the threaded head is connected to the pillar wall. The inside of the guide element exhibits opposing grooves, which run axially and in which there are external axial strips, which are molded on in the threaded head of the sleeve element and correspond with these grooves.

The sleeve element sits in the Y direction so as to move in the guide element, which is connected stationarily to an inside reinforcing plate or to a wall of the pillar of the vehicle body. The head of the sleeve element exhibits notches in the area of the strips. Between these notches and the axial grooves in the guide element there are clamping elements, such as spring elements or the like. So that the threaded nut cannot rotate at the same time that the connecting screw is tightened, there are two axial strips.

To hold the threaded nut of the sleeve element in the correct position prior to assembly or to enable in a simple manner the replacement of the deformation element following head impact, the guide element is provided, for example, with one or with two retaining spring(s). They are located either in the grooves for the strips of the threaded nut and lock in the corresponding notches or are offset by 90 degrees thereto.

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 1:
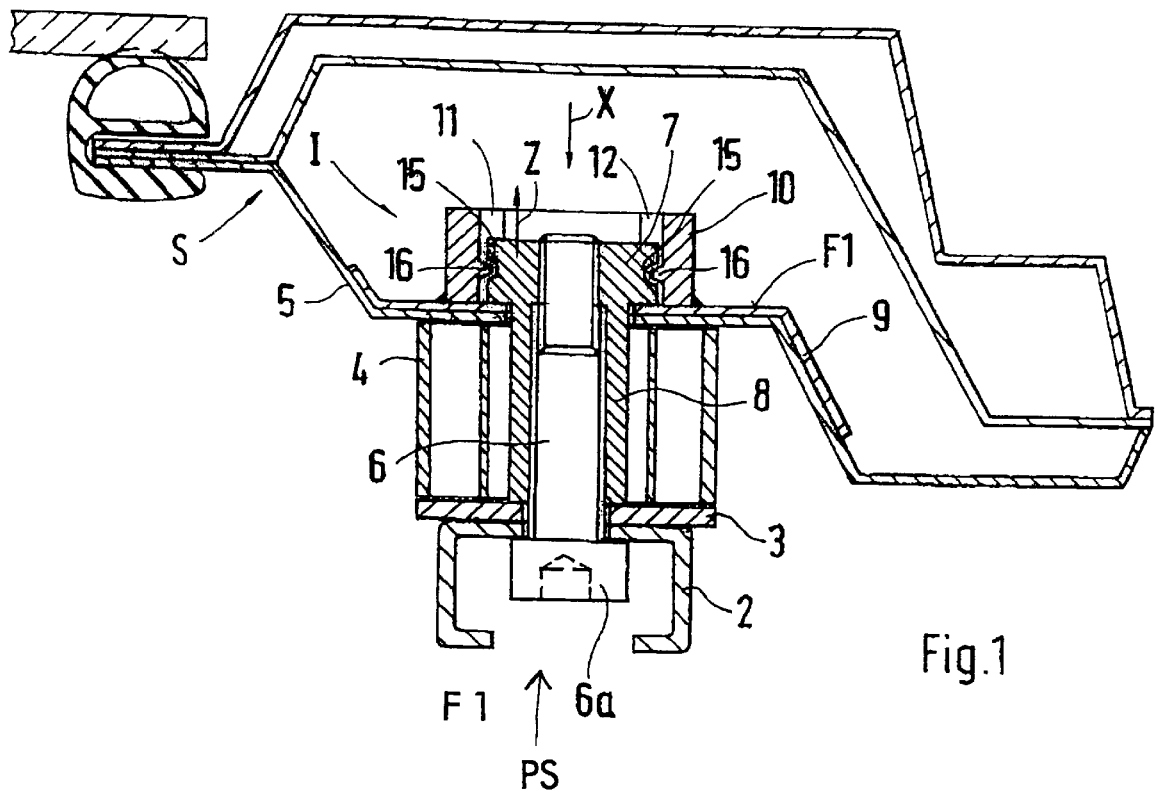
FIG. 1 is a horizontal sectional view of a vehicle pillar with deformation element and an installed device for a vertical belt adjuster constructed according to a preferred embodiment of the invention.

A first design provides a deformation element, which is intended for a safety belt system and which comprises a device with a receiving element, like a support plate 3, which can be connected to a locking rail 2 of the belt system. The deformation element 4 is disposed between the support plate 3 and a wall 5 of a body pillar S. The deformation element 4 serves to absorb collision forces against the locking rail 2.

The locking rail 2 is held on the pillar S by means of at least one connecting screw 6, which can be screwed into a threaded head 7 of a sleeve element 8. In use, the locking rail 2 faces a passenger space PS and is subjected to forces F from a passenger head during a vehicle collision condition.

The sleeve element 8 is formed in such a manner that the threaded head 7 is braced, for example, against a reinforcing plate 9 in a pillar S, but is otherwise braced directly against the wall 5, and extends with its adjoining cylindrical sleeve member axially through the deformation element 4 as far as and up to the support plate 3 and is braced here with its face. The threaded head 7 is disposed in a guide sleeve 10, which is connected stationarily, for example, to the reinforcing plate 9 and is fastened to the pillar wall 5.

The guide sleeve 10 exhibits axial, internal grooves 11, 12, which lie opposite each other and in which external, axial strips 13, 14 of the threaded head 7 are guided. In this manner in the event of a head impact the threaded head 7 with the sleeve element 8 is displaced specifically in the direction of the Z arrow under compression of the deformation element 4, 40 so that the threaded head detaches from the wall surface F1.

So that the guide sleeve 8 can be held in position during installation, a retaining spring 16, which is held on the guide element 10 so as to clamp, projects into at least one notch 15 of the threaded head 7.

Figure 2:
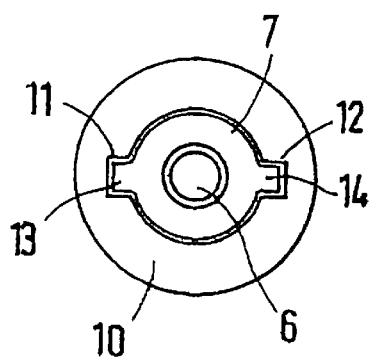
FIG. 2 is a view of the device in the direction of the arrow X in FIG. 1.

Although only one deformation element assembly is shown in FIGS. 1 and 2, it should be understood that practical embodiments are contemplated with two or more such assemblies disposed spaced from one another along the length of the locking rail.

Figure 3:
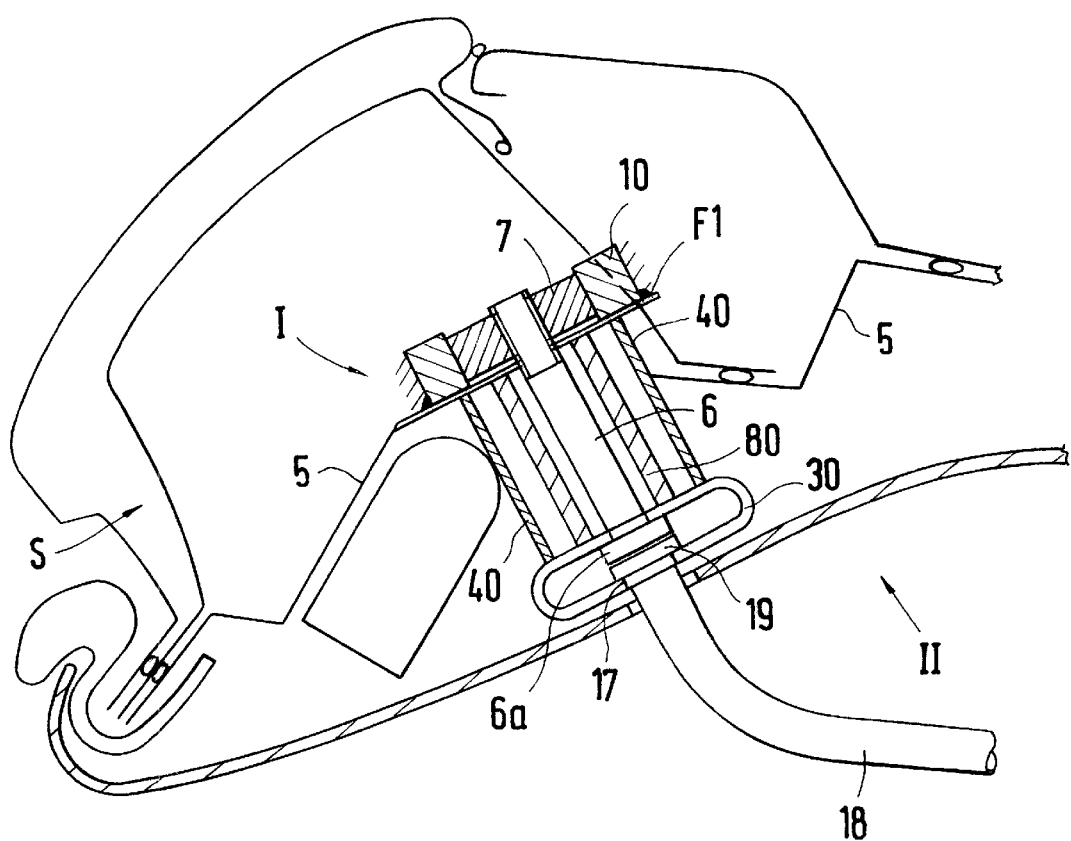
FIG. 3 is a sectional view of another design of the deformation element for use for a retaining rod of a net-equipped partition wall in a motor vehicle.

According to another design of the invention, as shown in FIG. 3, the deformation element 40 is used for the retaining rods 18 of a net-equipped partition wall, disposed at right angles in the vehicle. In FIG. 3, similar reference numbers are used for similarly operating elements as in FIG. 1 described above. An oval shaped locking element 30, which is disposed between the deformation element 40 and the rod 18, is used as the receiving element for the free ends of the retaining rods 18. The rod 18 exhibits on its free end a collar 19, which can be inserted into a keyhole shaped receiving opening 17 and can be locked in the same. The collar 19 is opposite the screw head 6a of the fastening screw 6, so that in the event of head impact the force can be introduced into the deformation element 40.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle deformation element assembly for a vertical belt adjuster of a safety belt system or for a retaining rod of a net-equipped partition wall in a motor vehicle, whereby the deformation element is disposed between a receiving element and a vehicle body pillar of a motor vehicle, wherein the receiving element is held on a pillar wall of the vehicle body pillar with intercalation of the deformation element;

wherein a fastening screw, which is passed axially through the receiving element and the deformation element, is held in a threaded head of a sleeve element, wherein the threaded head rests against an inside wall surface of the pillar wall in an operating position; and wherein in a head impact position the threaded head is detached from the inside wall surface of the pillar wall.

2. The motor vehicle deformation element assembly, as claimed in claim 1, wherein the sleeve element extends from the receiving element axially through the deformation element and is braced with the threaded head against the inside wall surface of the pillar wall, the fastening screw being held in such a manner that the receiving element is braced against the pillar wall between the threaded head of the sleeve element and a screw head of the fastening screw.

3. The motor vehicle deformation element assembly, as claimed in claim 1, wherein a support plate is disposed between a locking rail of a vertical belt adjuster and the deformation element.

4. The motor vehicle deformation element assembly, as claimed in claim 2, wherein a support plate is disposed between a locking rail of a vertical belt adjuster and the deformation element.

5. The motor vehicle deformation element assembly, as claimed in claim 2, wherein the receiving element includes a locking element disposed between the deformation element and the retaining rod of the net equipped partition wall.

6. The motor vehicle deformation element assembly, as claimed in claim 5, wherein the locking element exhibits a keyhole shaped insertion opening for the retaining rod, an end side of the retaining rod having a collar which reaches under the keyhole shaped opening in the locking element for the purpose of fixing the rod in position.

7. The motor vehicle deformation element assembly, as claimed claim 1, wherein a guide element is connected to the pillar wall, an interior side of the guide element exhibiting opposing grooves which extend axially, and wherein external axial strips, which are molded on in the threaded head of the sleeve element correspond with and engage in these grooves.

8. The motor vehicle deformation element assembly, as claimed claim 2, wherein a guide element is connected to the pillar wall, an interior side of the guide element exhibiting opposing grooves which extend axially, and wherein external axial strips, which are molded on in the threaded head of the sleeve element correspond with and engage in these grooves.

9. The motor vehicle deformation element assembly, as claimed claim 3, wherein a guide element is connected to the pillar wall, an interior side of the guide element exhibiting opposing grooves which extend axially, and wherein external axial strips, which are molded on in the threaded head of the sleeve element correspond with and engage in these grooves.

10. The motor vehicle deformation element assembly, as claimed claim 5, wherein a guide element is connected to the pillar wall, an interior side of the guide element exhibiting opposing grooves which extend axially, and wherein external axial strips, which are molded on in the threaded head of the sleeve element correspond with and engage in these grooves.

11. The motor vehicle deformation element assembly, as claimed claim 6, wherein a guide element is connected to the pillar wall, an interior side of the guide element exhibiting opposing grooves which extend axially, and wherein external axial strips, which are molded on in the threaded head of the sleeve element correspond with and engage in these grooves.

12. The motor vehicle deformation element assembly, as claimed in claim 7, wherein the threaded head of the sleeve element exhibits notches in the strips and wherein between these notches and the grooves of the guide element there are clamping elements.

13. The motor vehicle deformation element assembly, as claimed in claim 8, wherein the threaded head of the sleeve element exhibits notches in the strips and wherein between these notches and the grooves of the guide element there are clamping elements.

14. The motor vehicle deformation element assembly, as claimed in claim 9, wherein the threaded head of the sleeve element exhibits notches in the strips and wherein between these notches and the grooves of the guide element there are clamping elements.

15. A motor vehicle safety belt adjuster assembly for a vehicle having a vehicle pillar with a hollow space therein, comprising:

a belt system locking rail;

a plastically deformable deformation element disposable in use between the locking rail and a vehicle pillar wall;

a sleeve element with a threaded head which in use is disposed in the hollow space of the vehicle pillar and engageable with a pillar wall surface facing toward the hollow space, and a fastening screw extending in use through the locking rail and deformation element and threadably engaging the threaded head to clamp the locking rail and deformation element at the pillar wall, wherein said sleeve element is movable with said threaded head into said hollow space and away from said pillar wall in response to collision impact forces against the locking rail.

16. The motor vehicle safety belt adjuster assembly as claimed in claim 15, comprising a support plate interposed between the locking rail and the deformation element.

17. The motor vehicle safety belt adjuster assembly as claimed in claim 15, wherein the sleeve element extends axially through the deformation element and is braced with the threaded head against a pillar inside wall surface facing toward the hollow space.

18. The motor vehicle safety belt adjuster assembly as claimed in claim 17, comprising a support plate interposed between the locking rail and the deformation element.

* * * * *